United States Patent
Gupta

(10) Patent No.: US 10,367,698 B2
(45) Date of Patent: *Jul. 30, 2019

(54) INTERNET ACCESS AUTHORIZATION AND REGULATION SYSTEMS AND METHODS FOR CONTROLLED ENVIRONMENT OF AN INSTITUTIONAL FACILITY

(71) Applicant: KEEFE GROUP, LLC, St. Louis, MO (US)

(72) Inventor: Atul Gupta, Grimes, IA (US)

(73) Assignee: KEEFE GROUP, LLC, St. Louis, MO (US)

( * ) Notice: Subject to any disclaimer, the term of this patent is extended or adjusted under 35 U.S.C. 154(b) by 397 days.

This patent is subject to a terminal disclaimer.

(21) Appl. No.: 14/929,609

(22) Filed: Nov. 2, 2015

(65) Prior Publication Data
US 2016/0057023 A1    Feb. 25, 2016

Related U.S. Application Data

(63) Continuation of application No. 14/145,222, filed on Dec. 31, 2013, now Pat. No. 9,210,175.

(51) Int. Cl.
*H04L 29/06* (2006.01)
*H04L 12/24* (2006.01)
*G06F 3/0484* (2013.01)
*G06Q 50/26* (2012.01)

(52) U.S. Cl.
CPC ............ *H04L 41/28* (2013.01); *G06F 3/0484* (2013.01); *G06Q 50/26* (2013.01); *H04L 63/0861* (2013.01); *H04L 63/101* (2013.01)

(58) Field of Classification Search
CPC ..... H04W 12/00; H04W 12/06; H04W 12/08; H04L 41/28; H04L 63/00; H04L 63/10; H04L 63/101; H04L 63/104; H04L 63/105; H04L 63/108; H04L 63/08; H04L 63/0861; G06F 3/0484; G06Q 50/26
USPC ....................................... 726/4, 27
See application file for complete search history.

(56) References Cited

U.S. PATENT DOCUMENTS

| | | | |
|---|---|---|---|
| 8,832,374 B1 * | 9/2014 | Schaefers | H04L 67/1097 711/115 |
| 2003/0028532 A1 * | 2/2003 | Dougu | G06F 17/30867 |
| 2005/0188367 A1 | 8/2005 | Oberholtzer | |
| 2006/0064401 A1 | 3/2006 | Duncan | |
| 2010/0293386 A1 | 11/2010 | Kezzou et al. | |
| 2013/0226863 A1 * | 8/2013 | Jonker | H04L 41/00 707/609 |
| 2013/0263227 A1 | 10/2013 | Gongaware et al. | |

\* cited by examiner

*Primary Examiner* — Yogesh Paliwal
(74) *Attorney, Agent, or Firm* — Armstrong Teasdale LLP

(57) ABSTRACT

Access and regulations systems to facilitate safe and secure access of web content by residents of an institutional facility such as a correctional facility includes an administrator workstation to define authorized and prohibited web content, a resident workstation displaying on a predetermined list of web content, and a server receiving and processing the authorized and prohibited web content and requests made by institutional residents.

45 Claims, 6 Drawing Sheets understand the inventive technology described herein to its fully extent, some discussion of the state of the art is warranted below in Part I, followed by exemplary embodiments of systems in Part II and exemplary processes associated with the system in Parts III, IV and V.

INTERNET ACCESS AUTHORIZATION AND REGULATION SYSTEMS AND METHODS FOR CONTROLLED ENVIRONMENT OF AN INSTITUTIONAL FACILITY

CROSS REFERENCE TO RELATED APPLICATIONS

This application is a continuation application of U.S. patent application Ser. No. 14/145,222 filed Dec. 31, 2013 and now U.S. Pat. No. 9,210,175, the disclosure of which is hereby incorporated by reference in its entirety.

BACKGROUND OF THE INVENTION

The field of the invention relates generally to administrative systems for institutional environments, and more specifically to Internet access authorization and regulation systems and methods for institutional environments such as correctional facilities.

Various types of institutional facilities are known that house residents in a controlled environment. Such institutional facilities include, for example, correctional facilities such as prisons and jails, hospitals, convalescent homes, long term care facilities, nursing homes, psychiatric facilities, rehabilitation facilities and developmental disability facilities. Activities of residents in such controlled environments are in some cases restricted, and a high degree of supervision is exercised over the residents. This is especially so in correctional facilities housing incarcerated individuals, often referred to as inmates. As a result, significant administrative difficulties exist in such institutional environments, including but not limited to correctional facilities, that do not necessarily exist in other environments.

Networked computer systems exist in many institutional facilities today, but tend to be closed access systems that are carefully restricted for most users. In the correctional facility context, inmates may be authorized for limited use of existing systems to purchase goods from a commissary service, schedule appointments, make telephone calls, send and receive emails or messages to and from persons outside the facility, access inmate financial accounts administered by the facility, obtain information and announcements from the facility, etc. Such systems may also process commissary orders from inmates, accept deposits and debit inmate financial accounts for purchases or other transactions, and otherwise streamline management of the facility.

While existing computer systems designed to meet the needs of institutional environments have made great strides to date in providing both increased convenience to institutional residents such as inmates and reducing efforts on facility administrators to provide and oversee various services and activities, they have yet to completely meet the needs of the marketplace and improvements are desired. In particular, any ability to effectively implement online access to the Internet in a safe and secure manner for at least some residents of an institutional facility is sorely lacking.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
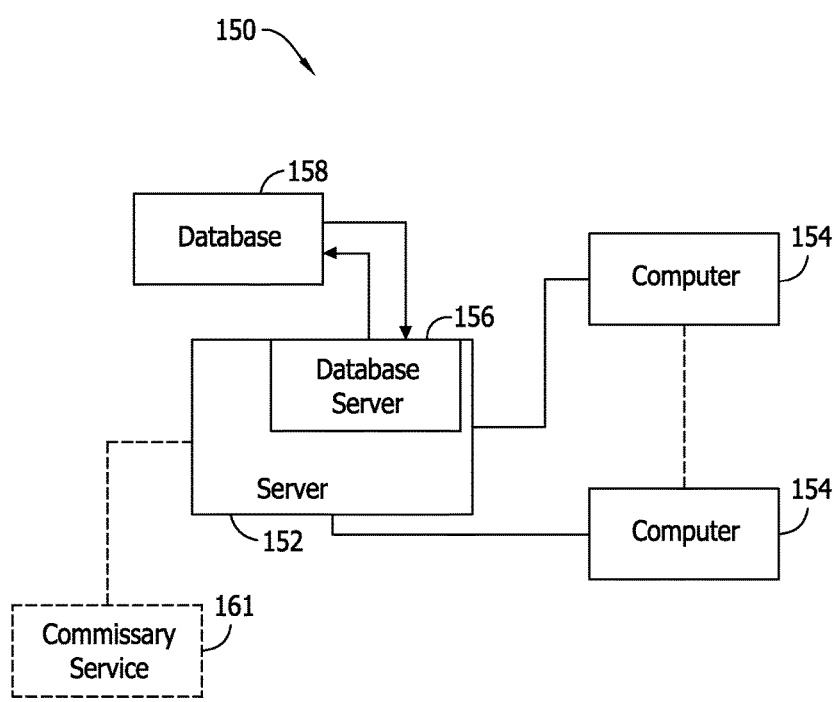
FIG. 1 is a simplified block diagram of an exemplary embodiment of a kiosk-based Internet access authorization and regulation systems for an in institution housing residents in a controlled environment.

In order to understand the inventive technology described herein to its fully extent, some discussion of the state of the art is warranted below in Part I, followed by exemplary embodiments of systems in Part II and exemplary processes associated with the system in Parts III, IV and V.

I. Introduction and State of the Art

For a variety of reasons, resident access to the Internet has generally been prohibited in controlled environments of institutional facilities, including but not necessarily limited to correctional facilities. Existing software controls designed for non-institutional environments are not practical for controlled environments of institutions and the particular issues associated with the type of controlled environments that they present.

A wealth of information is now available online and accessible via the Internet. For the general population, managing the accessible information available on the Internet can be challenging because the Internet provides a mix of helpful and unhelpful, if not harmful, content for the typical user. For discussion purposes herein, the term "web content" as used herein shall refer to websites, webpages, and web links accessible to a person via the Internet. A website typically is a collection of webpages made available at a particular domain, a webpage represents a portion of the website that a user can interact with when visiting a website, and web links are hyperlinks presented on a webpage that provide a path to another webpage or website if selected by a user. Some websites and webpages can be quite sophisticated, and may include a relatively high number of web links to other webpages of the same website and/or other websites. A variety of web browsers are known that allow persons to search and access websites and webpages.

In use, web browsers allow a user to enter an address of a particular website or webpage when known, or alternatively to enter general search criteria. Search engines, often affiliated with the web browsers, are also known that return a list of websites or webpages that may relate to a search query made by a user. Software is also known that is designed to filter and block selected Internet websites having certain types of content for certain users. Known web content filtering and blocking software, such as popular parental controls and the like, is typically integrated with or operates in tandem with web browsing software.

According to predefined criteria set by one type of user (e.g., a parent), known filtering and blocking features may allow with different users (e.g., one or more children) Internet access with prohibitions to accessing certain web content defined by the predetermined criteria, while also allowing one user (e.g., an adult) to monitor the activity of another user (e.g., a child) when accessing the Internet. As such, known filtering and blocking software provides some ability to track Internet activity of certain users and preclude their access to certain types of web content. Nonetheless, known filtering and blocking software still offers a vast degree of freedom for users to access a wide variety of websites and content that would be undesirable, if not unacceptable, in a controlled environment of a correctional facility or other institutional environment housing residents in a controlled manner. In other words, browser-based software generally provides an ability to monitor Internet activity and filter/block access, based on user-provided preferences and criteria, to broadly defined categories of information available via web.

The accuracy of such browser-based filtering/blocking software is sometimes better than others, and such browser-based software typically lacks controls for user to strictly review and control the accuracy of filtered or blocked search results that may otherwise be made available. Apart from web content related to user-provided filtering/blocking preferences, however, browser-based filtering/blocking software generally provides unfettered access to a vast amount of the content available on the Internet. Controlled environments demand essentially the opposite approach to that of known browser-based filtering/blocking software, namely an ability to provide access to a limited amount of material, while otherwise restricting, if not entirely precluding, unfettered access to a vast amount of the content available on the Internet.

On a related note, certain types of known filtering and blocking software removes entire websites from being returned in search results and/or blocks access to entire websites that are identified as objectionable. However, websites are not uncommon that offer a mix of materials, some of which may be objectionable to certain users and some of which may not be objectionable. This includes popular sites such as YouTube that present very kid-friendly video materials as well as graphic material and other content that is adult oriented. Some known websites themselves also include age gates and the like in which a user must certify his or her status as an adult to view certain types of content. Generally, however, the user is guided by his or her own discretion, or lack thereof, in making decisions to view certain types of content. While known software packages may work reasonably well for households involving a relatively small number of people, or even for business environments where access to certain websites or content can be uniformly blocked, they are disadvantaged for a relatively large population of residents in a controlled environment such as a correctional facility. Average residents such as inmates or patients in certain types of treatment facilities cannot be trusted, and sometimes are not capable of exercising sound discretion when browsing online.

Indeed, the concept of a web browser is altogether contrary to the needs of an institutional environment such as a correctional facility in which security issues and a need to closely monitor inmate activity predominates. Because of a general lack of adequate controls and safeguards available to institutional facilities today to monitor and prevent improper or inappropriate use of the Internet by facility residents, Internet access by institutional residents such as inmates and certain types of medical patients in an institutional treatment facility is generally not made available in many controlled environments.

On another level, browser software is also known that provides an ability to "browse" content of all drives on a local computer machine and/or other computer machines that are connected and accessible on a network. Such abilities are wholly undesirable for residents of institutional facilities in controlled environments.

While Internet access prohibition to date in many controlled environments of institutional facilities is perhaps understandable, there would be benefit to at least some residents such as inmates of having some access to the Internet. For example, inmate access to some appropriate information available on the Internet is hardly objectionable, and there may be good reason to allow institutional residents at least some access to the Internet. More specifically, and as non-limiting examples, access to healthcare sites and medical information on the Internet, access to specific portions of the United States Social Security Administration website, access to certain educational materials, and even access to some news or entertainments sites, would not be unreasonable for many institutional residents such as inmates. However, there is no existing means that reliably provides limited access only to such specific type of information or web content on the Internet for residents of controlled environments, while generally excluding other types of information or web content on the Internet, and while facilitating strict supervision and oversight by controlled environment administrators and personnel. It would be desirable to provide institutional residents such as inmates access only to unobjectionable information in a manner that would not overly burden correctional facility officers and administrators to manage in a safe and secure manner, and it would likewise be desirable to institutional administrators to tailor limited access to only certain web content to meet specific needs of certain residents.

General purpose proxy servers and firewalls may be utilized to some degree to prevent access to certain websites in a controlled environment, but lack flexibility and ease of use for controlled environment administrators of institutional facilities to effectively manage access across a population of residents having different needs. Such proxy server and firewall arrangements tend to provide an all or none solution in which it is difficult to accommodate different degrees of access to different residents as desired.

II. Exemplary System and Architecture of the Invention

Exemplary embodiments of controlled Internet access and regulation systems and methods are described hereinbelow that address the problems discussed above and resolve longstanding and unfulfilled needs in the art.

As explained in detail below, exemplary embodiments of controlled Internet access and regulation systems provide secure systems/methods that give controlled environment institutional facilities such as correctional agencies granular control over Internet access by residents. The controlled Internet access and regulation systems allow facility administrators, including but not limited to correctional facility officers, to identify specific web content each incarcerated individual (inmate) may access, as well as reliably tracking Internet usage by inmates, while also reducing the burden on facility administrators to oversee the online access by inmates with convenient grouping tools. Method aspects will in part be implicit and will in part be explicitly discussed in the following description, and while described primarily in the correctional facility context, the benefits and advantages of the exemplary embodiments may accrue to other types of institutional environments or even non-institutional environments wherein controlled access is desired.

Figure 2:
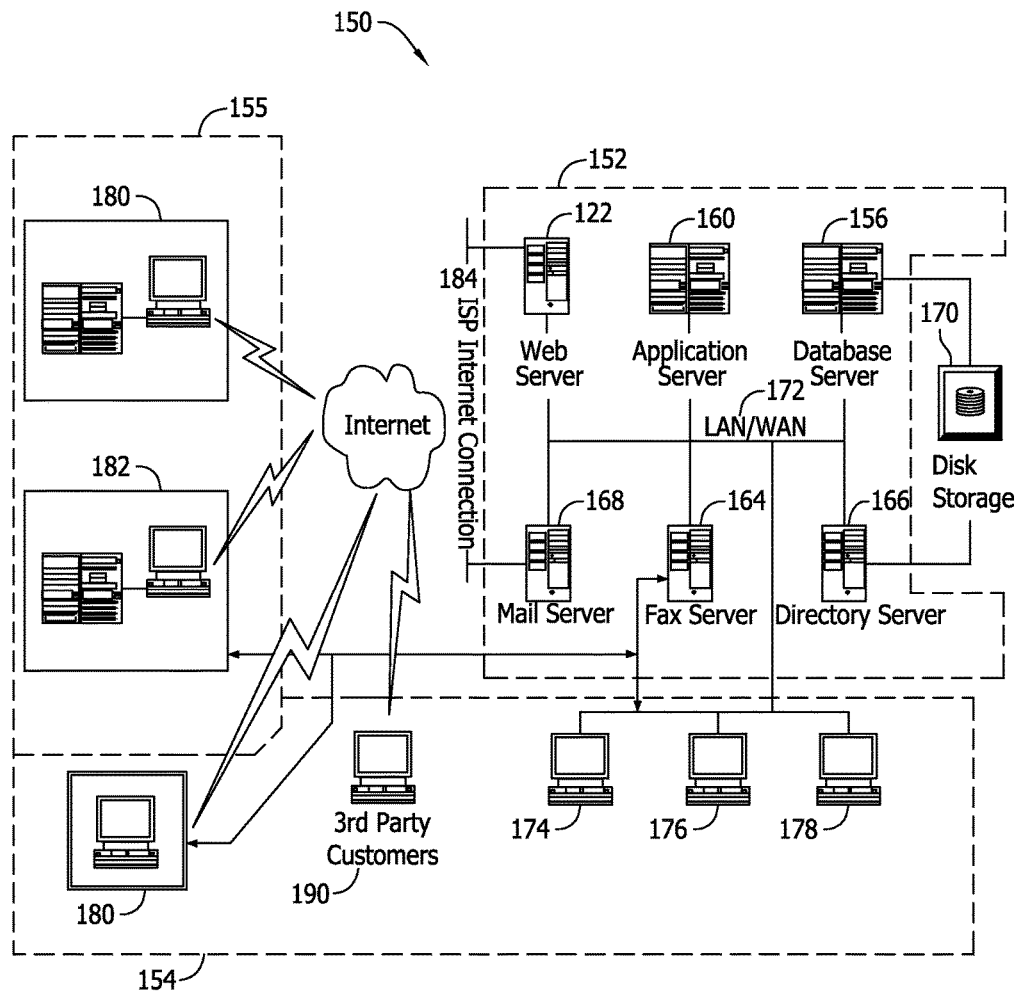
FIG. 2 is an expanded block diagram of an exemplary embodiment of a server architecture of the system shown in FIG. 1.
Figure 3:
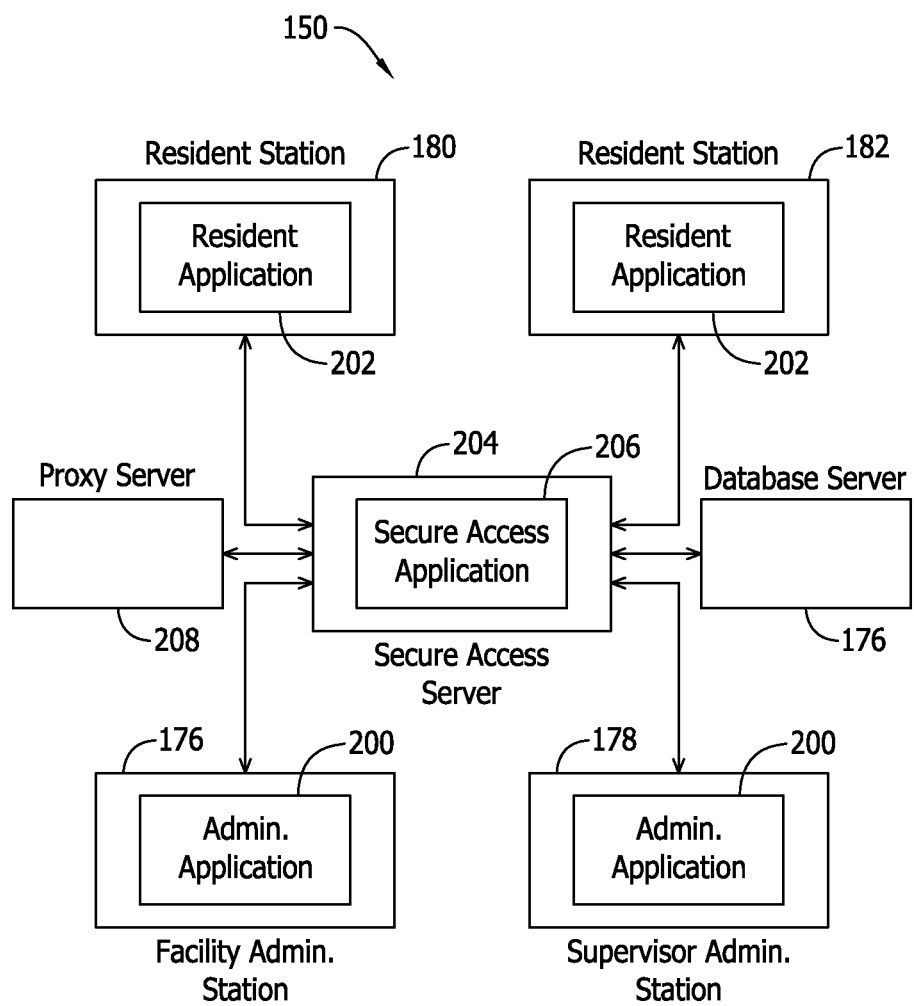
FIG. 3 is another simplified block diagram of the architecture shown in FIG. 2.

FIGS. 1-3 illustrate aspects of an exemplary controlled environment administration system 150, that in one embodiment is a computer program or software embodied on a computer readable medium and utilizing, for example, a Structured Query Language (SQL) with a client user interface front-end for administration and a web interface for user input, access, and information retrieval and reports. The administration system 150 may be web enabled and may be run on a business-entity intranet or alternatively may be fully accessed by individuals having an authorized access outside the firewall of the business-entity through the Internet. In an exemplary embodiment, the system 150 may be running in a Windows® environment or operating system that is commercially available from Microsoft Corporation of Redmond, Wash. The application may be flexible and designed to run in various different environments without compromising any major functionality.

FIG. 1 is a simplified block diagram of an exemplary embodiment of the system 150 including a server system 152, and a plurality of client administrative sub-systems 154 and client residential sub-system 155, connected to the server system 152. Computerized modeling and grouping tools, as described below in more detail, are stored in the server system 152 and can be accessed by a requester at any one of the client systems 154 and 155. In one embodiment, certain of the client systems 154 and 155 are computers or other electronic devices including a specialized application, such that the server system 152 is accessible to the client systems 154 using existing local area network, wide area network or a secure connection over the Internet while other of the client systems 154, 155 are not provided with a web browser so that only a limited and predetermined set of web content is made available as further described below.

The client systems 154 or 155 may be interconnected to the special secure access application server, described below, through many interfaces including, for example, a network such as a local area network (LAN) or a wide area network (WAN), dial-in-connections, cable modems and special high-speed ISDN lines. The client systems 154 may be any device capable of interconnecting to the Internet, run an application and have the ability to use standard network protocols to connect to secure access application server including a web-based phone, personal digital assistant (PDA), or equivalents thereof. The ability to connect to a network allows client systems 154 and/or 155 to be remotely located from the server 152, such as, at a correctional facility, a medical facility, another institutional environment or a non-institutional environment. A database server 156 is connected to a database 158 containing information on a variety of matters, as described below in greater detail. In one embodiment, the database 158 is centralized and stored on the server system 152, and the database 158 may be accessed by potential users at one of the client systems 154 or 155 by logging onto the server system 152 through one of the client systems 154 or 155. In an alternative embodiment, the database 158 may be stored remotely from server system 152 and may be non-centralized.

FIG. 2 is an expanded block diagram of an exemplary embodiment of a server architecture of the system 150 including the server system 152 and the client systems 154. The server system 152 may optionally include the database server 156, an application server 160, a web server 162, a fax server 164, a directory server 166, and a mail server 168. A disk storage unit 170 may be coupled to the database server 156 and the directory server 166. The servers 156, 160, 162, 164, 166, and 168 may be coupled in a local area network (LAN) 172. In addition, a system administrator's workstation 174, a user workstation 176, and a supervisor's workstation 178 may be coupled to the LAN 172. Alternatively, workstations 174, 176, and 178 may be coupled to LAN 172 using an Internet link or are connected through an intranet. One or more of the workstations 174, 176 and 178 may include an administrator interface application, described further below, for use by institutional facility administrative personnel or other persons to control the use of the system 150 by institutional residents such as inmates or other persons exclusively to limited and preauthorized or predetermined web content.

In contemplated embodiments, each workstation 174, 176, and 178 may be a personal computer or other electronic device having a web browser. Although the functions performed at the workstations typically are illustrated as being performed at respective workstations 174, 176, and 178, such functions may be performed at one of many personal computers coupled to the LAN 172. Workstations 174, 176, and 178 are illustrated as being associated with separate functions only to facilitate an understanding of the different types of functions that can be performed by individuals having access to the LAN 172.

The server system 152 in one embodiment is configured or adapted to be communicatively coupled to various individuals via some of the client systems 154, including resident workstations 180 and 182 associated with the institutional facility for which the system 150 is associated using any standard local area or wide area networking technology including cellular data, broadband, MPSL, T1 or ISDN, VPN over Internet. The communication in the exemplary embodiment is illustrated as being performed using T1 lines, however, any other wide area network (WAN) type communication can be utilized in other embodiments. That is, the system 150, and its operating algorithms and processes described below are not necessarily limited to being practiced using T1 lines.

In an exemplary embodiment, any authorized individual at a workstation can access the server system 152 via one of the client systems 154. Workstations 180 and 182 may be personal computers or other electronic devices having a resident application interface described below, sometimes referred to as an inmate application interface. Workstations 180 and 182 may also be kiosks, in one example embodiment, similar to airline kiosks located within airports that allow passengers to check-in and print their own boarding passes without the assistance of an airline employee. The stand-alone kiosk may include a display screen to provide information to a user, and also may include an input device, such as a keyboard, a mouse, or a touch screen, positioned at least partially within a protective casing. In exemplary embodiments, a touch screen is a preferred input device compared to a mouse or a keyboard because a touch screen is more rugged, and less prone to damage than a mouse or a keyboard. Additionally, third party customers may communicate with the server system 152 via a workstation 190 having, for example, a web browser.

The fax server 164 may communicate with remotely located client systems 154. The fax server 164 may be configured or adapted to communicate with other client systems including but not limited to the workstations 174, 176 and 178 as well for reporting purposes.

The functionality and programming of the system 150 is explained in detail below with respect to the methods and processes described in the algorithms detailed below. The technical effect of the processes and systems described herein is achieved when data and selections pertaining to authorized and prohibited web content, user information, and requests are supplied to and accepted by the administration system 150. The data and selections used by the system 150 may be supplied to and accepted by any of the workstations connected to the server system 152 as described above, or may be supplied from other sources if desired. Exemplary data and selections utilized by the system are described in some detail below.

The data and selections supplied to the system 150 may be stored or archived in the aforementioned server system 152, and the data and selections may be accessed by the system 150 to permit a reliable Internet access, regulation, tracking and oversight system with limited effort by facility administrators.

Referring now to FIG. 3, the system 150 is further illustrated as shown with Administration Applications 200 provided in each of the facility administrator workstation 176 and the facility supervisor administrator workstation 178. Resident Applications 202 are likewise provided in each of the resident workstations 180, 182 for use by a resident such as an inmate. The Administration Applications 200 of the workstations 176, 178 and the Resident Applications 202 of the workstations 180, 182 communicate with a Secure Access Server 204 provided with a Secure Access Application 206. The Secure Access Server 204 communicates with the database server 178 and a proxy server 208 as further described below.

While an exemplary embodiment of the system 150 having two resident workstations, two administration workstations, and one access server is shown, the system 150 is scalable to accommodate any number of desired users at the workstations provided. That is, additional applications 200, 202 and 206, additional workstations 176, 178, 180 and 182, and additional servers 204 may be provided in various embodiments. Varying numbers of users, such as institutional residents and administrators or other persons, may be accommodated depending on the number of workstations and servers provided.

It is also contemplated that in further/and or alternative embodiments, personal computer devices, notebook or laptop computer devices, computer kiosk devices, or tablet computer devices running various known operating systems may be employed and utilized in lieu of or in addition to one or more of the workstations 176, 178, 180 and 182 provided that such devices are provided with the appropriate one of the applications 200 or 202.

Of note, and as will become evident below, the system 150 does not utilize a web browser at the resident workstations 180, 182 made available to a resident (e.g., an inmate or patient of a controlled environment institution) or other user. All requests for web content made via the resident application(s) 202 at the workstations 180, 182 are processed through the Secure Access Server 204 and the Secure Access Application 206 and confirmed against approved and/or disapproved criteria per the Administration Application 200 and input from the facility administrators or other overseer via the administration workstations 176, 178. A resident such as an inmate has no ability to input or otherwise search for web content with the resident application 202, but rather may merely make a selection from a pre-authorized and categorized list of content as determined from the facility administrators or overseers via the Administration Application 200. An efficient use of groups for residents (e.g., inmates) and authorized (or denied) web content access sets renders a highly effective system with reduced ongoing effort by facility administrators and overseers. The system 150, via the Secure Access Sever 204 and the Secure Access Application 206 may also intelligently track activity and use by residents and inmates in a substantially automated manner.

The processes utilized in the system 150 and the applications 200, 202, 206 therein will now be explained. Algorithms may perform the processes described without violating known HTML and TCP/IP standards and protocols used to create web content on the world wide web.

The processes described below may be implemented conventionally in a computer program (or programs) embodied on a non-transitory computer readable medium and having segments of code or instructions executed by the computer(s) described that correspond to and effectuate the various functions and features of the processing of web content requests and administrator criteria and preferences described. The technical effect of the processes and systems described herein is achieved when data and selections pertaining to authorized and prohibited web content, data and selections administrative preferences, data and selections relating to user authorization criteria, and data and selections relating to residents requests are supplied to and accepted by the controlled environment administration system 150. The data and selections used by the system 150 may be supplied to and accepted by any of the workstations connected to the server system 150 as described above, or may be supplied from other sources if desired. Exemplary data and selections utilized by the system are described in some detail below.

III. The Administration Application and Processes

Processes 220 associated with the resident workstations 176, 178, and implemented with the Administration Application 200 are shown in the algorithmic flowchart shown in FIG. 3.

At step 222 an administrator or overseer login is accepted. Conventional login techniques, including but not limited to user id, password and/or biometrics login techniques may be utilized at step 222. The login information input may then be compared and validated to ensure that only authorized persons are provided further access to the workstation and to the following process steps.

At step 224, web content "Access Sets" are accepted. Each Administration Application 200 provided enables overseers such as correctional facility administrators to create Access Sets which in contemplated embodiments define a list of web content that is deemed to have appropriate content and therefore identified as accessible for a resident user using the system 150. Using the Administration application 200, an overseer may search for and view any available web content for possible consideration on an Access Set.

In contemplated embodiments, the facility administrators or other overseers, via the administration workstations 176, 178 and the browsers thereof, may enter the name of a particular website or otherwise search for web content and proceed to a particular webpage or list of web content returned by the browser. Each webpage or web content selected is then faithfully rendered at the administration workstations 176,178 for the administrator's or overseer's review. The administrator or overseer may accordingly designate webpages of various different websites for inclusion into an Access Set. Additionally, the administrator or overseer may designate multiple webpages of the same website to an Access Set. To ease a burden of numerous webpages of a website to an Access Set, the administrator can optionally add the entire website or a subsection of the website to more efficiently add webpages to an Access Set.

Further, an administrator may click on each link on a webpage being reviewed and determine whether or not the webpage associated with each link should be added to an Access Set. Such webpage level review provides an ability to finely control access issues that conventional web filtering and blocking software that operates on a website level cannot. That is, the administrator can authorize or prohibit access to specific webpages on a larger website rather than simply provide access (or not) to a website and all of its webpages as conventional web filters and blocking software does. The administrator can also authorize or prohibit access to related webpages by authorizing or prohibiting access to the links provided on any particular webpage Much flexibility is afforded in the page level review and authorization feature described. A very granular webpage-by-webpage and link-by-link access authorization scheme via inclusion in an Access Set is possible for websites and webpages presenting a mix of objectionable and unobjectionable web content. When appropriate or desired, entire websites or subsections of a website may be quickly designated in an Access Set to considerably speed up the review process by administrators or overseers that are already familiar with the contents of a website without reviewing it in detail first.

By definition, all webpages (or websites) or web links that are not explicitly included in an "Access Set" via the Administration Application 200 are deemed as not authorized in the system 150, and because no browser is provided at the resident user workstations 180, 182 web content that is not in an Access Set cannot be accessed at the resident user workstations 180, 182. Because no browser is provided at the resident workstations 180, 182, the resident users at the workstations 180, 182 have no ability to independently search for web content, but rather must choose from the web content made available by an Access Set. The resident user has no discretion other than to make a selection from the web content presented at the workstation 180, 182 via the Resident Application 202 as described below.

As shown at step 226, web content "Trump Sets" are also accepted by the Administration Application 200. Each Administration Application 200 provided enables overseers such as correctional facility administrators to create Trump Sets which in contemplated embodiments define a list of web content (whether entire websites, portions of a website, only certain webpages of certain websites, or certain web links) that are deemed as prohibited from being accessed for a resident user using the system 150. The Trump Sets may be created and accepted in a substantially similar manner to the Access sets by an administrator or overseer. In contemplated embodiments, the Access and Trump Sets can be created at the same time for acceptance by the system. That is, for web content under review, an administrator or overseer can designate an entire website, portion of a website, an entire webpage of a site, or any link on a webpage for inclusion on the Access Set or the Trump Set. Alternatively, the Access Set and the Trump Set can be independently defined and accepted by the system, whether by the same or different administrators or overseers.

In contemplated embodiments, each webpage (or entire website) or web link listed in a Trump Set is tagged with a hard deny. This denial of access trumps any conflicting authorization by an "Access Set." Thus, if an administrator or overseer inadvertently assigns or designates a webpage or web links thereof to an Access Set, or perhaps even assigns the same webpage or web link to both the Asset Set and the Trump Set, any designation of the same webpage or web links on a Trump Set will override the Access Set and access will be denied. If the ability to create a Trump Set is confined to fewer users than those able to create Access Sets, denial of access to web content on the Trump Set can effectively be ensured even when a person creating an Access Set lacks specific awareness of web content that has been predefined in Trump Set.

In the correctional facility context, the creation and acceptance of Access Sets and Trump Sets may be accomplished for resident inmates individually or as a group, such that one or more inmates may be provided with one or more "Access Sets" for the system in use based on a user class as shown at step 228. The user class may be assigned manually or automatically.

In the correctional facility context, inmates may be assigned to one of a plurality of user classes via the Administration Application 200 based on criteria such as housing (institution and or unit) assignment, privilege level, tentative release date, institution security level, etc. Each user class may be provided with different levels of access by the system. That is, the residents or inmates can be automatically associated with particular "Access Sets" and/or "Trump Sets" depending on the resident's or inmate's designation by the correctional facility agency using other applications of the system 150 or other systems and applications made available to agency Inmates may be assigned and reassigned over time to different Access Sets and Trump Sets when their housing unit or privileged level is changed by the agency. For example, violent offenders may be provided access to different web content than non-violent inmates via differently defined Access Sets and Trump Sets tailored to the needs and concerns associated with each resident/inmate group user class. Internet access may also be extended as revocable privilege that can be suspended or modified in response to specific behaviors and incidents involving particular inmates or residents.

In addition to manually assigning inmates to Access/Trump Sets at steps 228, the system, via the Administration Application 200, interfaces with other correctional facility systems in some embodiments to automatically add (and remove) inmates from the accepted user classes. For any given resident or inmate that is reassigned from one resident or inmate group user class to another resident or inmate group user class, the Access Set and Trump Sets of the new group will automatically be applied for that resident As shown at step 230, a class of service may also be accepted. The class of service is defined with the administration application 200 and in complementary embodiments sets time(s) of day the resident/inmate application(s) 202 can be used, a maximum duration of a resident access session, an amount of time between sessions for each resident/inmate, a maximum time allowed per day per resident/inmate, a maximum time allowed per week per resident/inmate, etc. The class of service may be assigned manually to individual residents/inmates or may be assigned as a group based on similar considerations to the user class as discussed above in relation to step 228. The service class allows the institutional facility to control time spent by an inmate and to prevent monopolization of resources. Multiple service classes may be defined with different parameters, and any change in the class of service for an inmate may be automatically applied by the system 150.

After initial setup, the Administration Application 200 allows facility administrators to easily edit, modify and disable particular "Access Sets" and "Trump Sets" for use by the system as shown at steps 232, 234 and 236. When editing the sets at step 232 and 234, web pages may and links may be added, subtracted, or re-designated for inclusion on one or more Access Sets or Trump Sets. Very fine changes are possible, and the Access Sets and Trump Sets can be optimally refined, expanded or contracted over time. Sets created and accepted can be disabled as a group as shown at step 236 to temporally suspend access or denial of web content for troubleshooting purposes or other purposes.

As shown at step 238, once a website, webpage or web links are designated for inclusion on an Access Set or a Trump Set, when that website, webpage or web link is again visited at the workstations 176 or 178, the Administration Application 200 will show the administrator or overseer the portions of the web page that have been listed in an "Access Set" or "Trump Set" already associated with that website, webpage or web link. As such, at some subsequent time after initial setup, an administrator or overseer may again view the web content and quickly assess which portions of the page have been designated as Access Set or Trump Set and make edits to the designation if desired.

As shown at step 240, categorization preferences are accepted. Each Administration Application 200 enables a facility administrator or overseer (e.g., a correctional facility officer) to categorize webpages in an Access Set so that it is easier for residents (e.g., inmates) to find authorized web content that meet a particular purpose. For example, website, web page or web link categorization may include category items such as job sites, legal information, social benefits programs, identification documents, etc. Webpages in the Trump Sets may be similarly categorized if desired using the Administration Application 200 for the benefit facility administrators.

As shown at step 242, printing preferences are accepted. Using the Administration Application 200, an administrator or overseer can set whether particular web content of an Access Set can be printed by the resident or inmate, and also whether the print function has a monetary cost or fee associated with it. This can be determined for each item of web content on an Access List individually or collectively. If a printing fee is chargeable, the system 150 can automatically process and charge any fees to an inmate's or resident's account when the inmate chooses to print a selected item of web content. Alternatively, processing of fees can be performed by other systems or other applications available to administrators of an institutional facility.

As shown at step 244, web content input preferences are accepted. Using the Administration Application 200, an administrator or overseer can set whether an input element such as mouse, keyboard or keypad is enabled or disabled. Thus, an inmate may be allowed or precluded from clicking, typing, or otherwise entering information on a webpage, either individually or based on user class or service class considerations. Web content input preferences may be assigned manually or automatically in different embodiments of the system 150.

At step 246, a resident user experience may be emulated by the Administration Application 200 to ensure that the desired selections have been made via steps described above. The Administration Application 200 includes an inmate application emulator, which allows a facility administrator or overseer (e.g., a correctional facility officer) to temporarily set themselves as a member of a particular user class and service class to test the performance of the associated Access Set and Trump Set for a resident/inmate or resident/inmate group. The emulator allows the administrator to evaluate the effective rights and user experience of a resident/inmate having the chosen membership, and the administrator may make any necessary corrections or modifications before the inmate is actually allowed to use the Access Set.

As shown at step 248, enable/disenable workstation preferences are accepted. The Administration Application 200 may identify workstations that are allowed to offer (or disallowed) form offering the Resident Application 202. For example, and via the Administration Application 200, only one of the workstations 180, 182 shown in FIG. 3 may make the inmate application 202 available. Also, and via the Administration Application 200, which of the workstations 180, 182 presents the Resident Application 202 may be changed. Much flexibility is provided here. The workstations 180, 182 may make the Resident Application 202 available one at a time for certain periods of time, or may make the Resident Application 202 available simultaneously at different workstations.

As shown at step 250, once the other steps have been satisfactorily completed, the Administration Application 200 sends the Access/Trump Sets and all the preferences and parameters discussed above to the Secure Access Server 204 (FIG. 3) for processing of selections made by a user at the resident workstations 180, 182. Once the Access Sets and the Trump Sets are created, including all the preferences and the parameters discussed above, the system 150 will dynamically compute the list of web content to which the particular the inmate has access rights by adding all permissions from his/her membership in "Access Sets" and then subtracting all webpages/sites disallowed by the membership in "Trump Sets."

Once the information for Access Sets, Trump Sets and preferences is sent to the Secure Access Server at step 250, it may be retrieved for modification, editing and inclusion of new web content and different selection of preferences using the steps described above. The steps may be repeated to create and accept any number of different Access or Trump Sets desired.

Having described the algorithmic processes of the Administration Application 200, it is believed that those in the art may program those processes to embody them on a non-transitory a computer readable medium having segments of code implementing and effectuating the features described in the Administration Application 200 running at the workstations 176, 178 or another computer device without further explanation.

IV. The Resident Application and Processes

Figure 5:
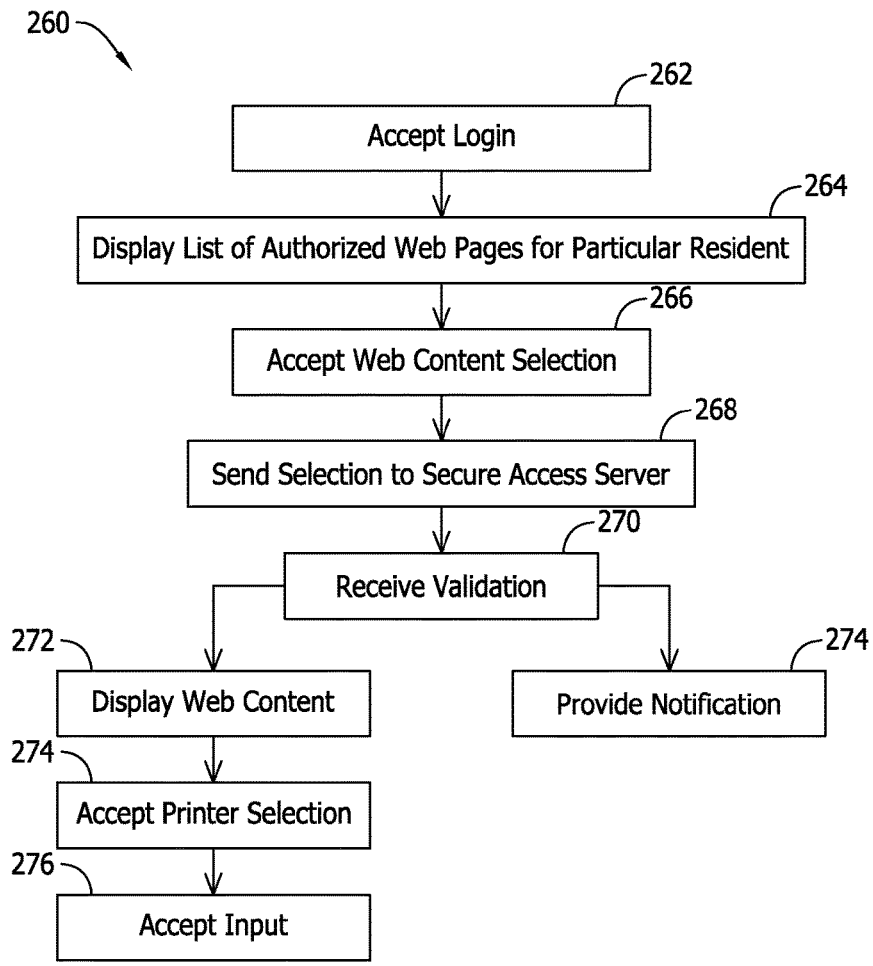
FIG. 5 is an algorithmic flowchart of exemplary processes associated with the Resident Application shown in FIG. 3.

Processes 260 associated with the resident workstations 180, 182, and implemented with the Resident Application 202 are shown in the algorithmic flowchart shown in FIG. 5.

Each Resident Application 202 provides a secure application for use by a resident (e.g., an inmate). In contemplated embodiments the Resident application requires residents to log into the application using combination of user id, password and/or biometrics as shown at step 262. The login information input may then be compared and validated to ensure that only authorized persons are provided further access to the workstation 180 and 182 and to the following process steps. The resident's user class and service class may be tied to the login so that it can be taken into account.

Once the resident (e.g., an inmate) is logged in at step 262, the Resident Application 202 displays a list of web content (e.g., the list of authorized web pages for the particular inmate identified at login) at step 264, which is retrieved from the Secure Access Server 204 based on the user's credentials as determined from the login. In contemplated embodiments, the retrieval of the list of web pages authorized is made in real time so that any changes made by facility administrators are immediately applied and enforced. The list of authorized web pages is dynamically created and is categorized for ease of use as determined by the processes 220 as shown and described in relation to FIG. 4 accepting the inputs from administrators and overseers.

As mentioned previously, there is no opportunity or place for the resident (e.g., an inmate) to type in a name of a website or webpage to visit, or otherwise to enter search criteria. Rather, the resident must make a selection from the list presented at step 264.

At step 266, a selection of the web content presented is accepted. For example, the resident user may click on a web link displayed in the web content list to accept a selection.

At step 208, the selection is sent to the Secure Access Server 204 and the resident application 202 awaits at step 270 validation from the Secure Access Server 204 and the Secure Access Application 206.

If the selection is validated at step 270, the web content is displayed at step 272. The displayed web content is now confirmed as authorized and is faithfully rendered per the webpage author's design. In other words, the selected webpage's dependencies on other websites and links to other webpages are correctly displayed if access is authorized and validated at step 270. The resident at the workstation 280, 282 can then proceed to review the web content of the page; and follow its links to other related webpages to the extent authorized. The system continues to accept and validate the selections at steps 268, 270 with each selection made.

If the selection is not validated at step 270, access to the web content is denied and a notification to the user is provided at step 274. The user may then make another selection and steps 266, 268 and 270 are repeated.

Once web content is displayed at step 272, the resident may choose to print the content and or make inputs as shown at steps 274 and 276. The accepted inputs from steps 274 and 276 are granted or denied according to the preferences set in steps 242, 244 of FIG. 4 by an administrator or overseer.

Any service class parameters are automatically applied starting at the time of login. The resident user may be provided with feedback regarding current and previous session use, time remaining until applicable limits are reached, etc. Warnings and notification may be provided as applicable limits are approached, and automatic logoff features may be implemented to ensure that the limits are not exceeded.

Having described the algorithmic processes of the Resident Application 202, it is believed that those in the art may program those processes to embody them on a non-transitory computer readable medium having segments of code implementing and effectuating the features described in the Resident Application 202 running on the workstations 180, 182 or another computer device without further explanation.

IV. The Secure Access Server Application and Processes

Figure 6:
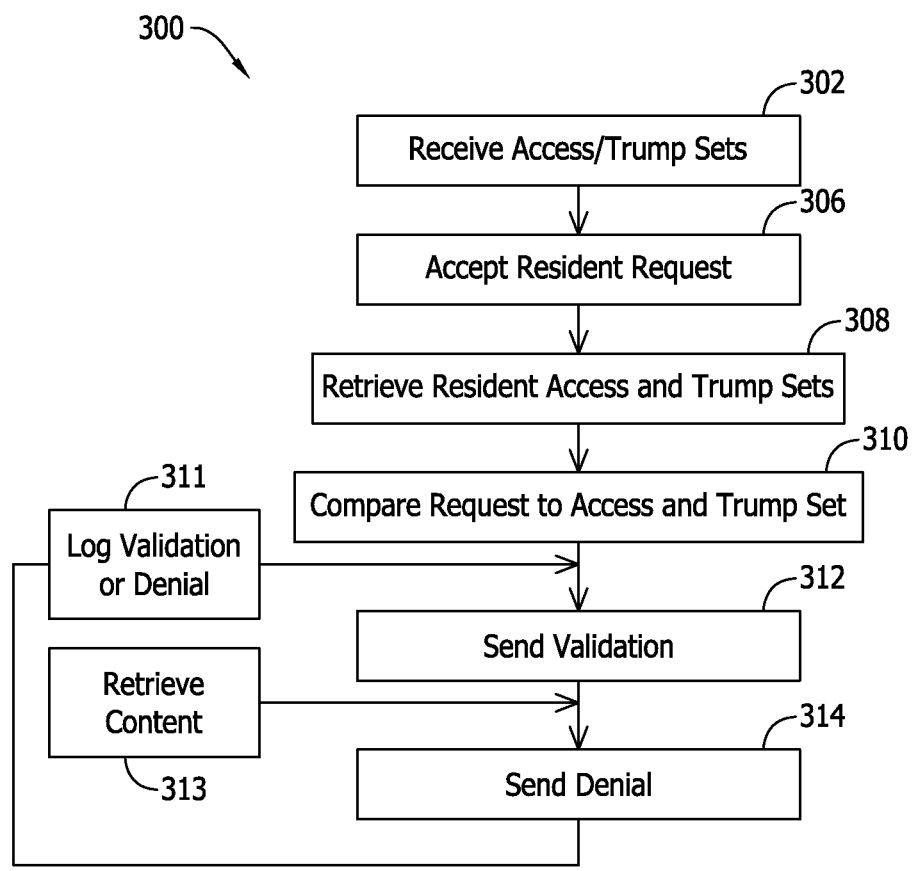
FIG. 6 is an algorithmic flowchart of exemplary processes associated with the Secure Access Application shown in FIG. 3.

Processes 300 associated with the Secure Access Server 204, and implemented with the Secure Access Application 206 are shown in the algorithmic flowchart shown in FIG. 6.

Figure 4:
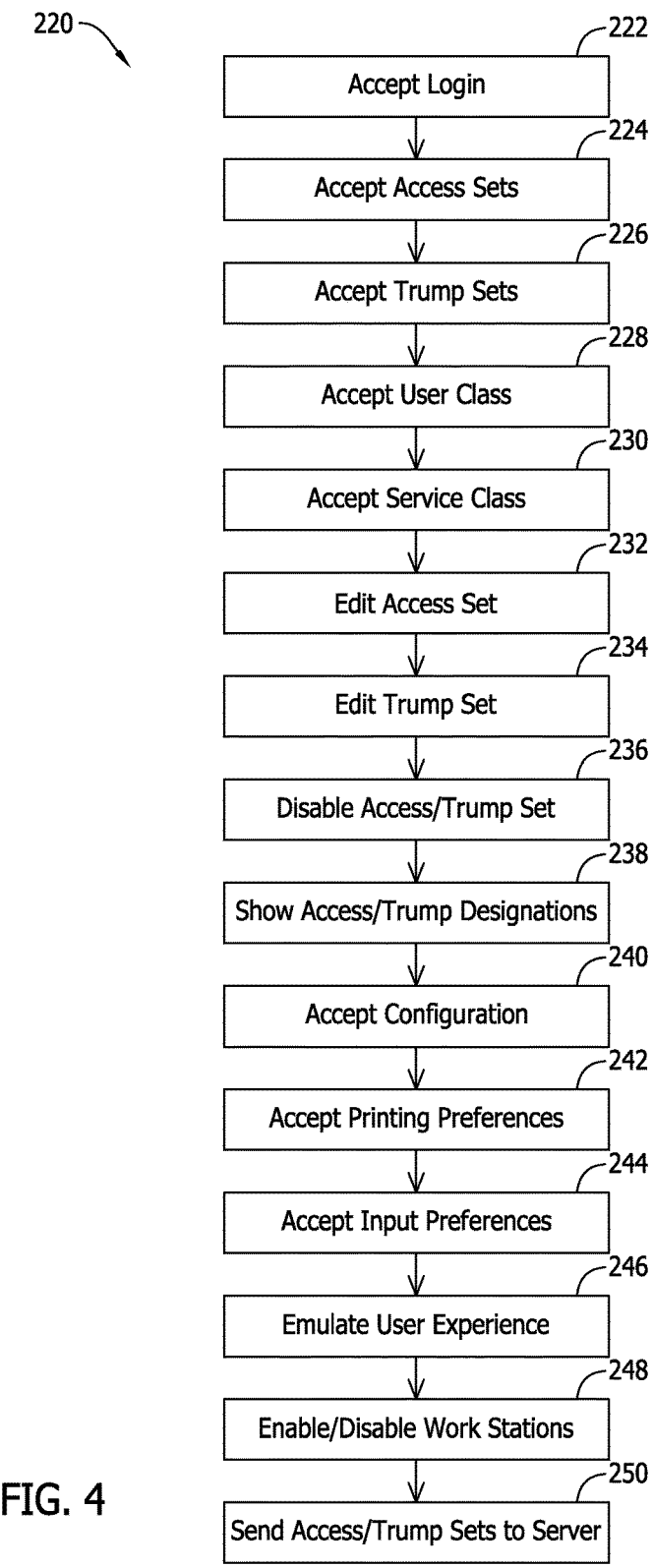
FIG. 4 is an algorithmic flowchart of exemplary processes associated with the Administration Application shown in FIG. 3.

At step 302, the Secure Access Server 204 receives the Access/Set Trump sets as defined by the administrator or overseer using the Administration Application processes of FIG. 4.

At step 306, the system 150, via the Secure Access Application Server 204 and the Secure Access Application 206, receives a requested selection for web content from a resident (e.g., an inmate) via the Resident Application 202 and the processes shown in FIG. 5. When the resident/inmate clicks a link on the web content displayed by the Resident Application 202, the accepted link is sent to the Secure Access Server 204. The Secure Access Application 206 then confirms that the resident has the right to access the web content.

In contemplated embodiments, the Secure Access Application 206 retrieves the Access Set and Trump Set for the resident. In contemplated embodiments this retrieval is made in real time as each request is made at step 306 to ensure that any changes made by facility administrators are immediately affected and enforced.

At step 310, the Secure Access Application 206 compares the Request to the retrieved Access and Trump Sets.

If the resident request is in the Access Set, but not in the Trump Set, the request is validated. The validation is logged at step 311 and a validation is sent to the resident station at step 312. At step 313 the Secure Access Application 206 retrieves the authorized web content (e.g., the authorized webpage) from the web via the Secure Access Server 204 (FIG. 3) and sends the authorized web content to the Resident Application 202.

If the resident requested web content is not in the Access Set, or alternatively if the requested web content is in the Trump Set, the request is denied at step 311 and a notification is sent to the resident station at step 314. The inmate does not have authorization to access the requested content. The Secure Access Application may then return to step 302 and await another resident request.

At step 311, the validation or denial event is logged and stored for future retrieval. The system, via the Secure Access Server 204 and the Secure Access Application 206, will log key data (date/time, webpage, inmate and workstation details, etc.) about each successful delivery of authorized content to a resident (e.g., an inmate).

The system 150, via the Secure Access Server 204 and/or the Secure Access Application 206, may also analyze logged validation and denial events to detect usage trends and, as appropriate, suggest to administrators that changes to the Access/Trump Sets and preferences accepted via the processes shown in FIG. 4 are advisable.

Having described the algorithmic processes of the Secure Access Application 206, it is believed that those in the art may program those processes to embody them on a non-transitory computer readable medium having segments of code implementing and effectuating the features described in the Secure Access Application 206 running on the Secure Access Server 204 or another computer device without further explanation.

VI. System and Process Adaptations

The systems and processes of the invention are not limited to the specific embodiments described herein. Components of each system and each process can be practiced independent and separate from other components and processes described herein. Each component and process also can be used in combination with other components, systems and processes. Varying degrees of complexity and functionality may be provided for cost management reasons and to meet the needs of particular environments and/or particular system users. It should now be apparent that the system components and functionality may be mixed and matched to generate varying systems which obtain the benefits of the present invention to varying degrees.

The benefits of the inventive concepts are now believed to be evident and amply illustrated in view of the exemplary embodiments disclosed. Secure access and redundant checks are provided to meet the needs of institutional environments and ensure access exclusively to pre-authorized web content and minimizing, if not obviating, any opportunity for an institutional resident to conduct mischief on the Internet or otherwise inappropriately use or obtain web content. The Internet access and regulation systems described record detailed data as the system operates and allow efficient tracking and monitoring of resident usage of the system so that system usage can be studied in great detail and optimized. The access and regulation systems may be rather easily set up and modified by administrators and overseers, and much flexibility is afforded to optimize the system to meet particular objective and needs to implement and maintain a secured controlled environment for institutional residents and other users.

An embodiment of exemplary Internet access authorization and regulation system has been disclosed, including: a first computer configured to accept an Access Set of web accessible content and a Trump Set of prohibited web content; a second computer configured to display a predetermined list of web accessible content and accept a selection from the predetermined list; a server configured to accept the selection from the predetermined list and compare the selection to the Access Set and to the Trump Set; and if the accepted selection is in the Access Set but not in the Trump Set, provide access to the selected web content from the predetermined list at the second computer.

Optionally, if the accepted selection is in the Access Set and is in the Trump Set, access to the selected web content is refused by the system at the second computer. At least one of the first and second computers may be located in an institutional facility housing residents in a controlled manner. The institutional facility may be a correctional facility and the residents may be inmates. The Access Set may include at least one webpage, and the Access Set may be categorized by a user of the first computer. The second computer may be configured to accept a biometric identifier for a user.

The first computer may optionally be configured to accept a service class, wherein the service class determines an access time to the system. The service class may be assigned to each user of the second computer, and the system may be configured to automatically apply the assigned service class to a user of the second computer. The user may be an inmate of a correctional facility.

The first computer may further be optionally configured to accept a user class, and at least one of the Access Set and the Trump set may be defined by the user class. The user class may be assigned to each user of the second computer, and the system may be configured to automatically apply the assigned user class to a user of the second computer. The user may be an inmate of a correctional facility.

As still further options, the first computer may also accept a selection corresponding to whether or not at least one of the items in the Access Set displayed on the second computer can be printed. The first computer may be configured to accept a selection whether a fee will be charged if at least one of the items in the Access Set is printed. The first computer may be configured to emulate a user experience of a person using the second computer. The first computer may be configured to accept a selection whether an input element of the second computer is enabled or disabled when at least one of the items in the Access Set is accepted. The input element may be one of a keyboard and a keypad.

At least one of the first and second computers may be selected from the group of a workstation, a personal computer, a notebook or laptop computer, a computer kiosk, and a tablet computer.

Another embodiment of an Internet access authorization and regulation system has been disclosed, including: a first computer having an administration application configured to accept a first set of authorized web accessible content and a second set of prohibited web content; a second computer having a user application configured to display a predetermined list of web content and accept a user selection therefrom; wherein the system is configured to compare the accepted user selection to at least one of the first and second sets to determine whether the request is valid; and if the accepted selection is determined to be valid, provide access to the selected web content at the second computer.

Optionally, the system may include a secure access server interfacing the first and second computers, the secure access server being configured to compare the accepted user selection to at least one of the first and second sets to determine whether the request is valid. If the accepted selection is in the first set and is not in the second set, access to the selected web content is refused at the second computer by the system.

At least one the first and second computers may be located in an institutional facility housing residents in a controlled manner. The institutional facility may be a correctional facility and the residents may be inmates.

The first and second sets may each include a list of webpages. The second computer may be configured to accept a biometric identifier for a user.

The first computer may be configured to accept a service class regulating an access time to the predetermined list of web content. The service class may be assigned to each user of the second computer, and the system may be configured to automatically apply the assigned service class to a user of the second computer.

The first computer may also be configured to accept a user class, and at least one of the first set of authorized web accessible content and the second set of prohibited web content may be defined by the user class. A user class may be assigned to each user of the second computer, and the system may be configured to automatically apply the assigned user class to a user of the second computer.

The first computer may accept selection corresponding to whether or not at least one of the items in the predetermined list of web content displayed on the second computer can be printed. The first computer is further configured to accept a selection whether a fee will be charged if at least one of the items in the predetermined list of web content is printed. The first computer may be configured to emulate a user experience of a person using the second computer.

The first computer may be configured to accept a selection whether an input element of the second computer is enabled or disabled when at least one of the items in the predetermined list of web content is selected. The input element may be one of a keyboard and a keypad.

A method of providing secure access to web content has also been disclosed, the method including: accepting a first set of authorized web accessible content and a second set of prohibited web content with a first computer having an administration application; displaying a predetermined list of web content with a second computer having a user application; accepting a user selection from the predetermined lies of web content with the second computer; comparing the accepted user selection to at least one of the first and second sets to determine whether the accepted user selection is valid; and providing access to the selected web content at the second computer if the accepted selection is determined to be valid.

Optionally, the first and second computers may be interfaced with a secure access server, and comparing the accepted user selection to at least one of the first and second sets to determine whether the request is valid is performed by the secure access server. The method may include refusing access to the selected web content at the second computer if the accepted user selection is in the first set and is not in the second set.

The method may include locating at least one the first and second computers in an institutional facility housing residents in a controlled manner. More specifically, the method may include locating at least one the first and second computers in a correctional facility housing inmates in a controlled manner.

The method may include accepting a first set of authorized web accessible content and a second set of prohibited web content with a first computer having an administration application, and accepting at least one webpage on the first list and the second list.

The method may include accepting a biometric identifier with the second computer.

The method may include accepting a service class regulating an access time to the predetermined list of web content with the first computer. A service class may be assigned to each user of the second computer, and the method may include automatically applying the assigned service class to a user of the second computer. The method may include accepting a user class with the first computer, and at least one of the first set of authorized web accessible content and the second set of prohibited web content being defined by the user class. A user class may be assigned to each user of the second computer, and the method may include automatically applying the assigned user class to a user of the second computer.

The method may also include accepting a selection with the first computer that corresponds to whether or not at least one of the items in the predetermined list of web content displayed on the second computer can be printed. The method may include accepting a selection from the first computer whether a fee will be charged if at least one of the items in the predetermined list of web content is printed. The method may include emulating, with the first computer, a user experience of a person using the second computer. The method may include accepting, with the first computer, a selection whether an input element of the second computer is enabled or disabled when at least one of the items in the predetermined list of web content is selected. The input element may be one of a keyboard and a keypad. The method may include comparing the accepted user selection to at least one of the first and second sets to determine whether the accepted user selection is valid comprises comparing the accepted user selection to both of the first and second sets to determine whether the accepted user selection is valid.

A computer program embodied on a non-transitory computer readable medium for processing a request for web content by a resident of an institutional facility has also been disclosed. The request for web content is selected from a list of web pages displayed to the resident, and the program includes at least one code segment that: receives the request for web content from the inmate, and, in response to the received request: retrieves a first predetermined set of authorized web accessible content and a second predetermined set of prohibited web content as determined by an administrator of the institutional facility; compares the received request to at least one of the first and second predetermined sets to determine whether the received request is valid; and provides access to the requested web page if the accepted selection is determined to be valid.

Optionally, the at least one code segment compares the accepted user selection to both of the first and second sets to determine whether the accepted user selection is valid. The at least one code segment may refuse access to the requested web content at the second computer if the accepted user selection is in the first set and is not in the second set.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An Internet access authorization and regulation system, comprising:
   at least one computer that is configured to:
   receive a web accessible content selection made by a user that is overseen having no access to a web browser, the selection made by the user that is overseen from a predetermined list of authorized web accessible content presented to the user that is overseen without providing any ability to a user that is overseen to input or otherwise search for web content;
   compare the received web accessible content selection made by the user that is overseen to a predetermined Access Set of web accessible content and a predetermined Trump Set of prohibited web content each respectively determined by at least one user that is an overseer; and
   if the received web accessible content selection is in the Access Set but not in the Trump Set, provide the user that is overseen access to the web accessible content selection.

2. The system of claim 1, wherein the at least one computer is further configured to:
   if the accepted selection is in the Access Set and is in the Trump Set, refuse the user that is overseen access to the web accessible content selection.

3. The system of claim 1, wherein the at least one computer is located in an institutional facility housing resident users that are overseen in a controlled manner.

4. The system of claim 1, wherein the at least one computer is located in a correctional facility housing inmates.

5. The system of claim 1, wherein the Access Set of web accessible content includes at least one webpage.

6. The system of claim 1, wherein the at least one computer is configured to accept a biometric identifier for the user that is overseen.

7. The system of claim 1, wherein the user that is overseen is an inmate of a correctional facility.

8. The system of claim 1, wherein the Access Set is categorized by at least one overseer.

9. The system of claim 1, wherein the at least one computer comprises at least one first computer, at least one second computer, and a server.

10. The system of claim 1, wherein the at least one computer is a workstation.

11. The system of claim 1, wherein the at least one computer is a personal computer.

12. The system of claim 1, wherein the at least one computer is a notebook or laptop computer.

13. The system of claim 1, wherein the at least one computer is a computer kiosk.

14. The system of claim 1, wherein the at least one computer is a tablet computer.

15. An Internet access authorization and regulation system, comprising:
  a computer that is not provided with a web browser, the computer configured to:
    display, without providing any ability to a user that is overseen to input or otherwise search for web content, a predetermined list of web content;
    receive a selection from the predetermined list of web content; and
    based on a comparison of the accepted selection to at least one of a first set of authorized web accessible content and a second set of prohibited web content as determined by an administrative overseer, either:
      provide access to the received selection to the user that is overseen; or
      refuse access to the received selection to the user that is overseen.

16. The system of claim 15, wherein if the received selection is in the first set of authorized web accessible content and is in the second set of prohibited web content access to the received selection is refused.

17. The system of claim 15, wherein the computer is located in an institutional facility housing residents in a controlled manner.

18. The system of claim 17, wherein the institutional facility is a correctional facility and the residents are inmates.

19. The system of claim 15, wherein the first set of authorized web accessible content and the second set of prohibited web content each comprises a list of webpages.

20. The system of claim 15, wherein the computer is configured to accept a biometric identifier for the user that is overseen.

21. The system of claim 15, wherein the computer is configured to regulate an access time to the predetermined list of web content.

22. The system of claim 15, wherein the computer is configured to either allow or refuse the user that is overseen to print at least one of the items in the predetermined list of web content displayed on the computer.

23. The system of claim 22, wherein the computer is configure to charge a fee if at least one of the items in the predetermined list of web content is printed.

24. The system of claim 15, wherein the computer is configured to selectively enable or disable an input element of the computer.

25. The system of claim 24, wherein the input element is one of a keyboard and a keypad.

26. The system of claim 15, wherein the computer is a tablet computer.

27. A method of providing secure access to web content, the method comprising:
  presenting a predetermined list of web content to a user with a computer that does not include a web browser allowing the user to search for web content or request web content apart from the predetermined list of web content;
  accepting a user selection from the predetermined list of web content with the computer; and
  based on a comparison of the accepted user selection to at least a first predetermined set of authorized web accessible content and a second set of predetermined prohibited web content, the computer either providing access to the web content of the accepted user selection or refusing access to the web content of the accepted user selection.

28. The method of claim 27, wherein when the accepted user selection is in the first set of authorized web accessible content and is not in the second set of prohibited web content, access is provided to the web content of the accepted user selection.

29. The method of claim 27, wherein when the accepted user selection is in the first set and is in the second set, access is refused to the web content of the accepted user selection.

30. The method of claim 27, further comprising locating the computer in an institutional facility housing residents in a controlled manner.

31. The method of claim 27, further comprising accepting a biometric identifier with the computer.

32. The method of claim 27, further comprising regulating an access time to the predetermined list of web content with the computer.

33. The method of claim 27, further comprising determining whether or not at least one of the items in the predetermined list of web content can be printed.

34. The method of claim 27, further comprising applying a charge if at least one of the items in the predetermined list of web content is printed.

35. The method of claim 27, further comprising accepting enabling or disabling an input element of the computer.

36. The method of claim 35, wherein the input element is one of a keyboard or a keypad.

37. A system for processing a request for web content by a resident of an institutional facility, the request for web content being selected from a list of web pages displayed to the resident, the system comprising at least one computer configured to:
  receive the request for web content by the resident from the list of web pages displayed to the resident, without the resident having access to a web browser; and
  in response to the received request:
    retrieve a first predetermined set of authorized web accessible content and a second predetermined set of prohibited web content as determined by an administrator of the institutional facility;
    compare the received request to at least one of the first and second predetermined sets to determine whether the received request is valid; and
    retrieve the requested web content if the accepted selection is determined to be valid.

38. The system of claim 37, wherein the at least one computer compares the received request to both of the first predetermined set of authorized web accessible content and the second predetermined set of prohibited web content to determine whether the received request for web content is valid.

39. The computer program of claim 38, wherein the at least one computer refuses access to the requested web content if the received request for web content is in the first predetermined set of authorized web accessible content and is also in the second predetermined set of prohibited web content.

40. The system of claim 37, wherein the at least one computer is a workstation.

41. The system of claim 37, wherein the at least one computer is a personal computer.

42. The system of claim 37, wherein the at least one computer is a notebook or laptop computer.

43. The system of claim 37, wherein the at least one computer is a computer kiosk.

44. The system of claim 37, wherein the at least one computer is a tablet computer.

45. The system of claim 37, wherein the at least one computer comprises at least one first computer, at least one second computer, and a server.

* * * * *